United States Patent
Shukla et al.

(10) Patent No.: US 11,102,305 B2
(45) Date of Patent: Aug. 24, 2021

(54) METHOD AND SYSTEM FOR ROUTINE DISRUPTION HANDLING AND ROUTINE MANAGEMENT IN A SMART ENVIRONMENT

(71) Applicant: Samsung Electronics Co., Ltd., Suwon-si (KR)

(72) Inventors: Prakhar Shukla, Bangalore (IN); Nitish Varshney, Bangalore (IN); Parnab Kumar Chanda, Bangalore (IN); Prateek Singh Chauhan, Bangalore (IN); Ashok Subash, Bangalore (IN); Kumar Samir Saurabh, Bangalore (IN); Dinesh Somasekar Deva, Bangalore (IN); Seema Ramappa, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/493,650

(22) PCT Filed: Mar. 16, 2018

(86) PCT No.: PCT/KR2018/003137
§ 371 (c)(1),
(2) Date: Sep. 12, 2019

(87) PCT Pub. No.: WO2018/169372
PCT Pub. Date: Sep. 20, 2018

(65) Prior Publication Data
US 2020/0076898 A1    Mar. 5, 2020

(30) Foreign Application Priority Data

Mar. 17, 2017 (IN) .............................. 201741009376
Jun. 29, 2017 (IN) .............................. 201741022864

(Continued)

(51) Int. Cl.
*H04L 29/08* (2006.01)
*G06N 20/00* (2019.01)
(Continued)

(52) U.S. Cl.
CPC ........... *H04L 67/125* (2013.01); *G06N 7/005* (2013.01); *G06N 20/00* (2019.01);
(Continued)

(58) Field of Classification Search
CPC . H04L 12/2803–2838; H04L 29/06836; H04L 29/08558–08567; H04L 29/08675;
(Continued)

(56) References Cited

U.S. PATENT DOCUMENTS

| 4,491,914 A | 1/1985 | Sujaku |
| 8,781,716 B1 * | 7/2014 | Wenneman .......... G08G 1/0129 701/118 |

(Continued)

FOREIGN PATENT DOCUMENTS

| JP | 2017-045257 A | 3/2017 |
| JP | 2017-167599 A | 9/2017 |

(Continued)

OTHER PUBLICATIONS

ISA/KR, International Search Report and Written Opinion of the International Searching Authority, International Application No. PCT/KR2018/003137, dated Jul. 2, 2018, 8 pages.

(Continued)

*Primary Examiner* — Brendan Y Higa

(57) ABSTRACT

The disclosure relates to sensor network, machine type communication (MTC), machine-to-machine (M2M) communication, and technology for internet of things (IoT). The disclosure may be applied to intelligent services based on the above technologies, such as smart home, smart building, smart city, smart car, connected car, health care, digital (Continued)

education, smart retail, security and safety services. The disclosure describes a method and system for routine disruption handling and routine management in a smart environment. A method for operating an apparatus is provided. The method includes detecting, an operating condition of at least one of device applications and internet of things (IoT) devices associated with a routine of user activities; detecting disruptions in the operating condition of the at least one of the device applications and the IoT devices; identifying an impact on the user activities that are caused by the disruptions; and performing a disruption handling to provide a disruption solution for executing the routine of user activities.

20 Claims, 17 Drawing Sheets

(30) Foreign Application Priority Data

| Nov. 9, 2017 | (IN) | ............................ 201741040037 |
| Mar. 13, 2018 | (IN) | ............................ 201741009376 |

(51) Int. Cl.
*G06N 7/00* (2006.01)
*H04L 12/28* (2006.01)
*H04L 12/24* (2006.01)

(52) U.S. Cl.
CPC .... *H04L 12/2825* (2013.01); *H04L 29/08675* (2013.01); *H04L 29/08963* (2013.01); *H04L 29/08972* (2013.01); *H04L 41/0668* (2013.01); *H04L 67/22* (2013.01); *H04L 67/306* (2013.01); *H04L 67/325* (2013.01); *H04L 67/327* (2013.01)

(58) Field of Classification Search
CPC ......... H04L 41/0654–0695; H04L 67/12–125; H04L 67/22; H04L 67/306; H04L 29/08918–08972; H04L 67/30–327; G06Q 10/1097; G06N 7/00–08; G06N 20/00

See application file for complete search history.

(56) References Cited

U.S. PATENT DOCUMENTS

| 10,127,801 | B2* | 11/2018 | Raji ...................... G06F 16/954 |
| 10,177,930 | B1* | 1/2019 | Bodkin ................. G05B 15/02 |
| 10,718,632 | B1* | 7/2020 | Platt ...................... H04L 67/125 |
| 2005/0075116 | A1* | 4/2005 | Laird ...................... A61B 5/04 |
| | | | 455/456.3 |
| 2007/0245354 | A1 | 10/2007 | Tomita |
| 2008/0098441 | A1 | 4/2008 | Son |
| 2010/0228574 | A1* | 9/2010 | Mundinger ........ G01C 21/3423 |
| | | | 705/4 |
| 2014/0059466 | A1 | 2/2014 | Mairs et al. |
| 2014/0244568 | A1* | 8/2014 | Goel ...................... H04W 4/08 |
| | | | 706/52 |
| 2014/0309870 | A1* | 10/2014 | Ricci ...................... B60C 1/00 |
| | | | 701/36 |
| 2015/0154850 | A1* | 6/2015 | Fadell .................. G08B 29/185 |
| | | | 340/501 |
| 2015/0205275 | A1* | 7/2015 | Nakano ................ G06Q 10/109 |
| | | | 700/275 |
| 2016/0209059 | A1* | 7/2016 | Castillo ............... H04L 12/2825 |
| 2016/0321616 | A1* | 11/2016 | Gedge ............... G06F 16/24578 |
| 2016/0358065 | A1* | 12/2016 | Gedge ...................... G06N 7/00 |
| 2017/0295032 | A1 | 10/2017 | Shin et al. |

FOREIGN PATENT DOCUMENTS

| KR | 10-0739810 B1 | 7/2007 |
| KR | 10-2014-0037584 A | 3/2014 |
| KR | 10-1683692 B1 | 12/2016 |
| KR | 10-2017-0025885 A | 3/2017 |
| KR | 10-1746646 B1 | 6/2017 |
| KR | 10-2017-0115802 A | 10/2017 |

OTHER PUBLICATIONS

Examination Report dated Apr. 29, 2021 in connection with Indian Application No. 201741009376, 7 pages.

\* cited by examiner

[Fig. 1]
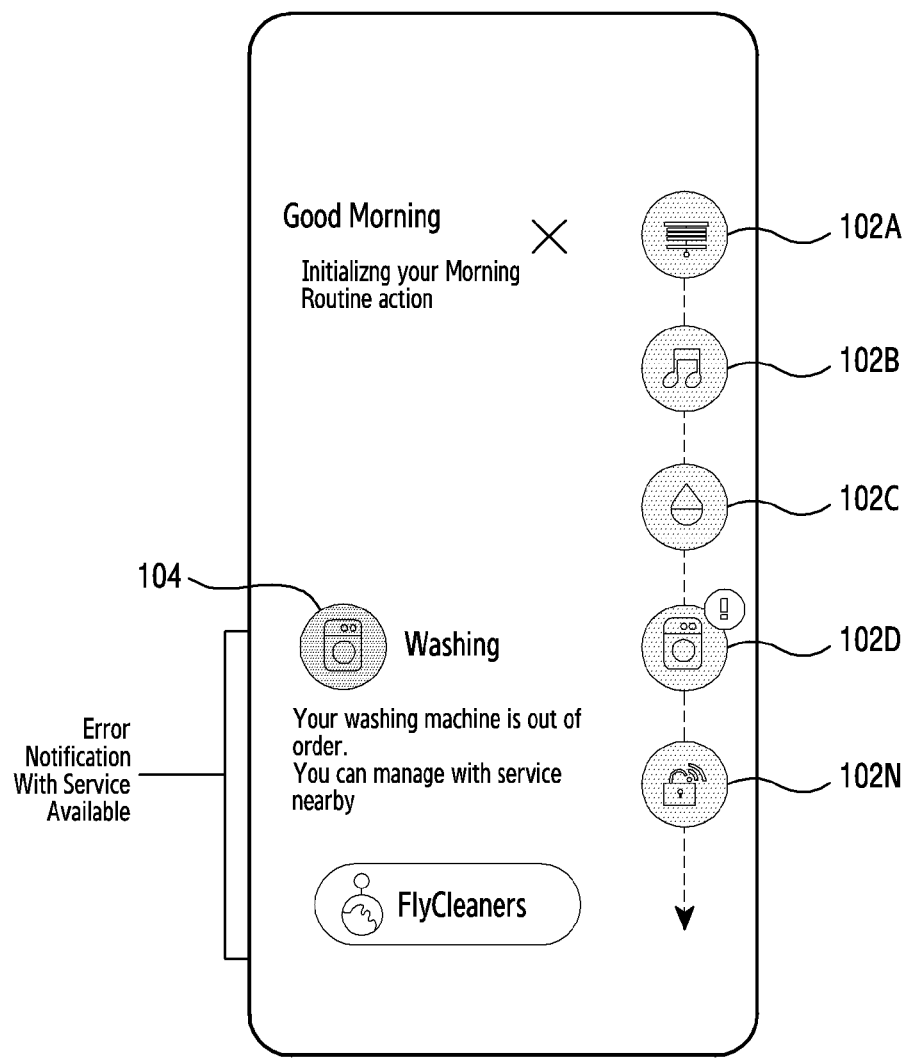

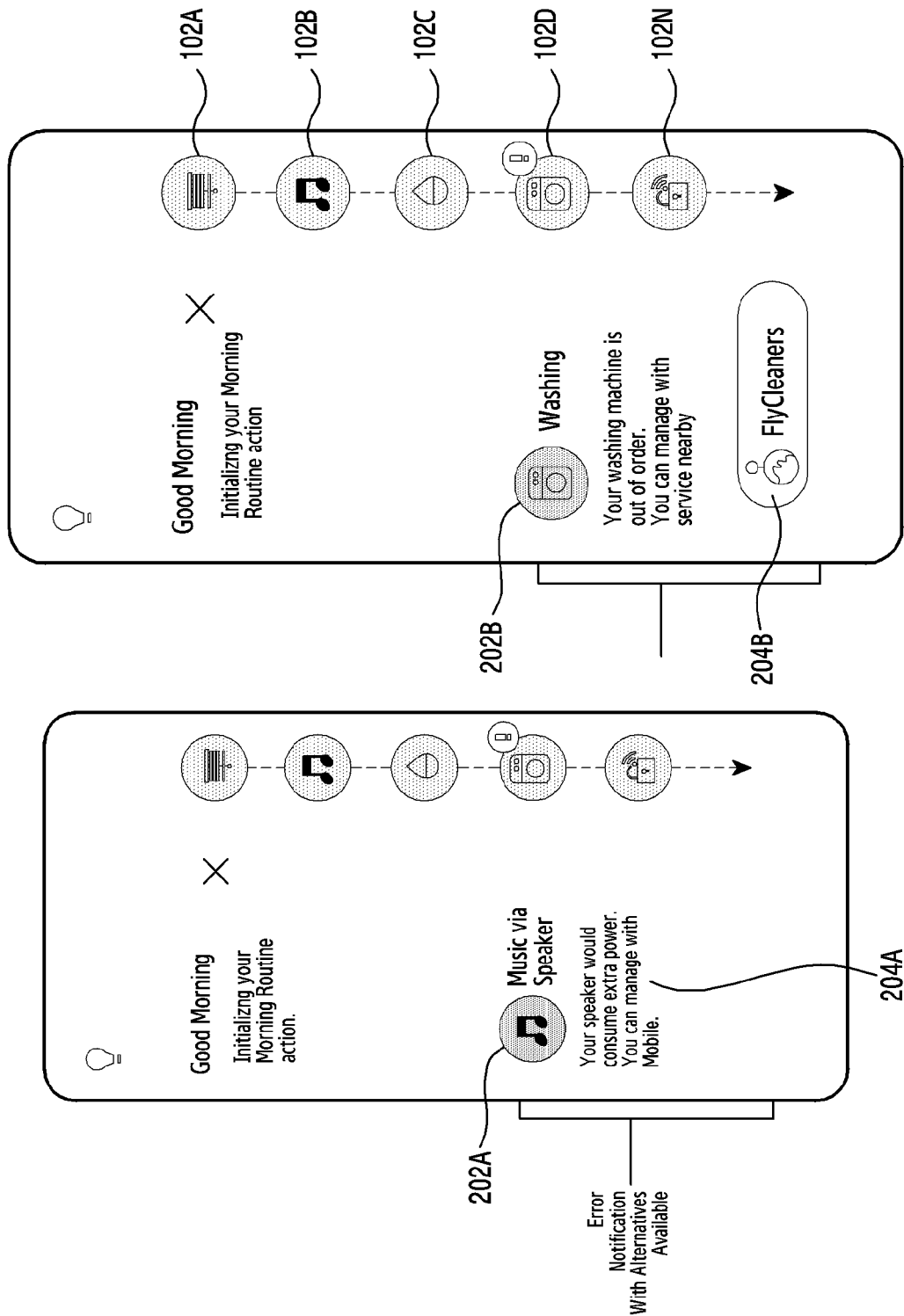

[Fig. 3]
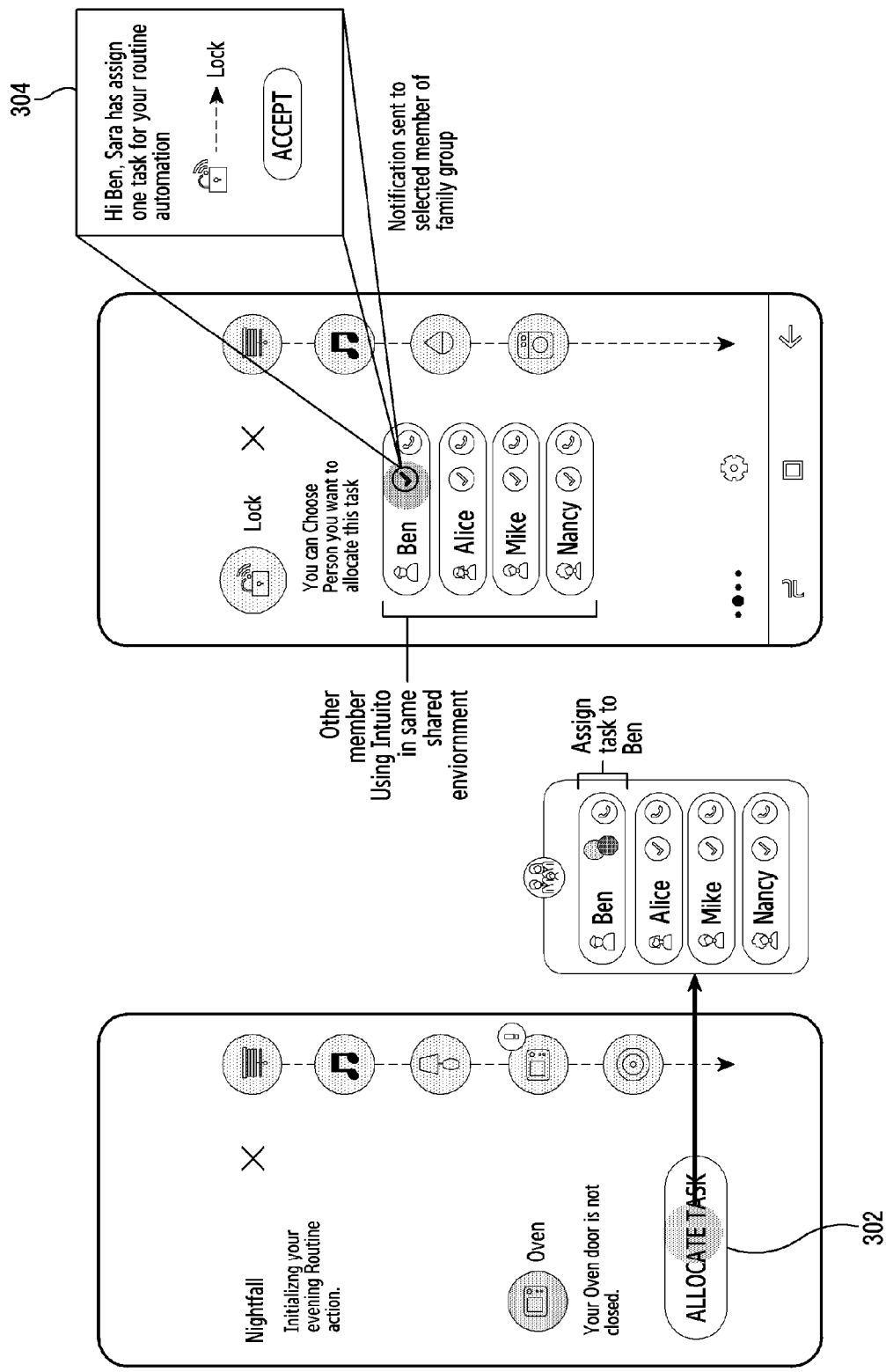

[Fig. 4]
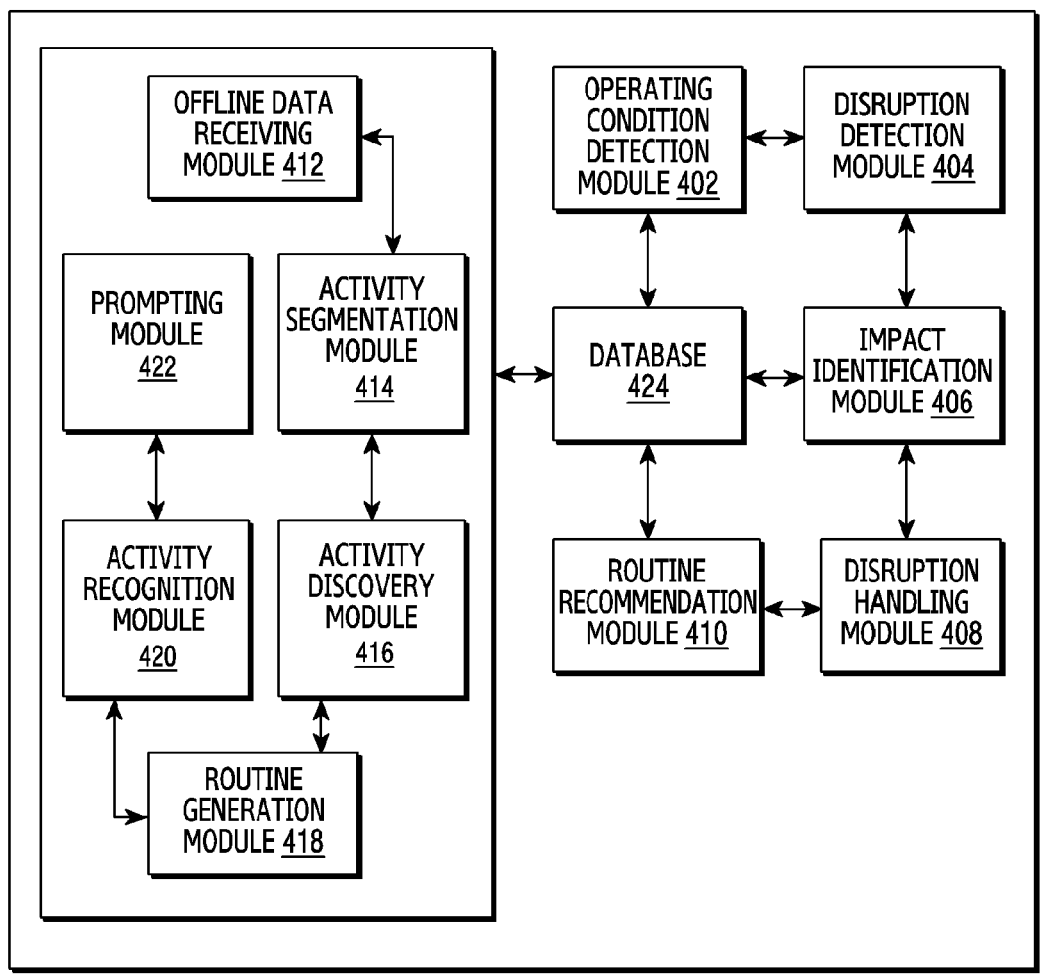

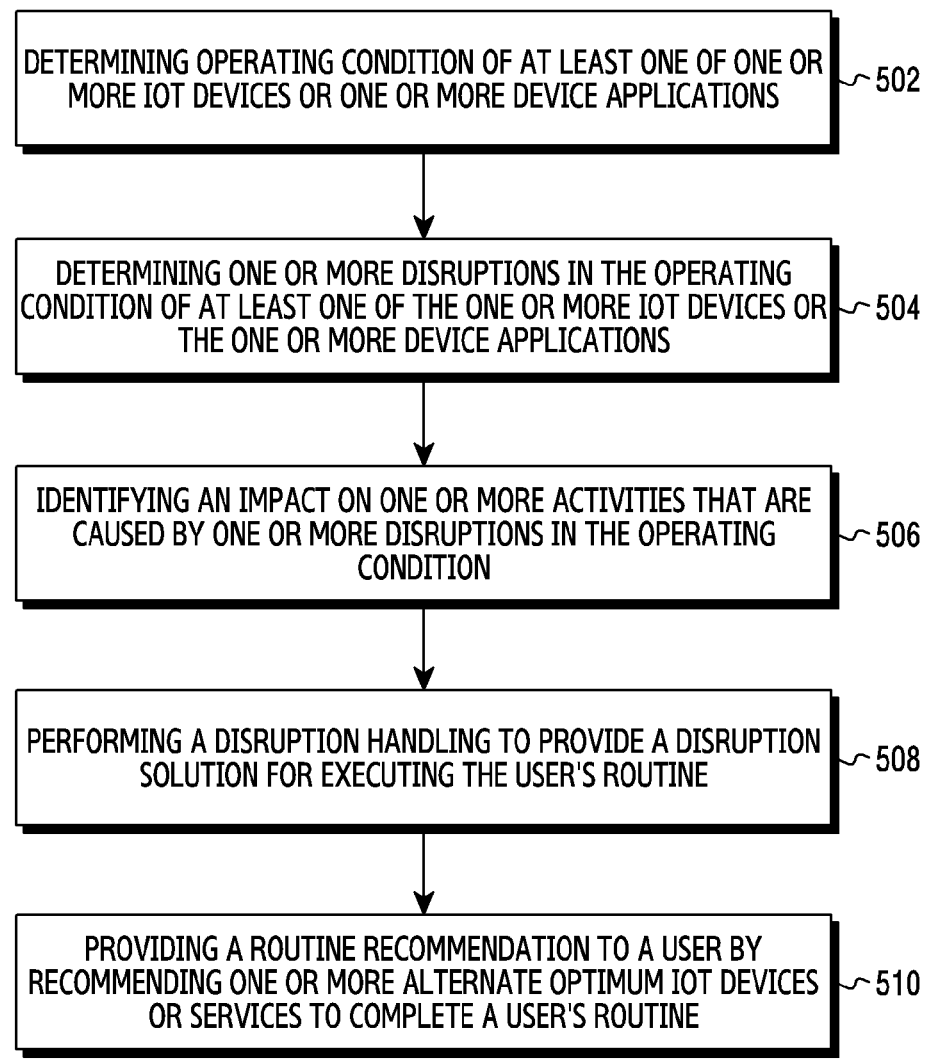
[Fig. 5]

[Fig. 6]
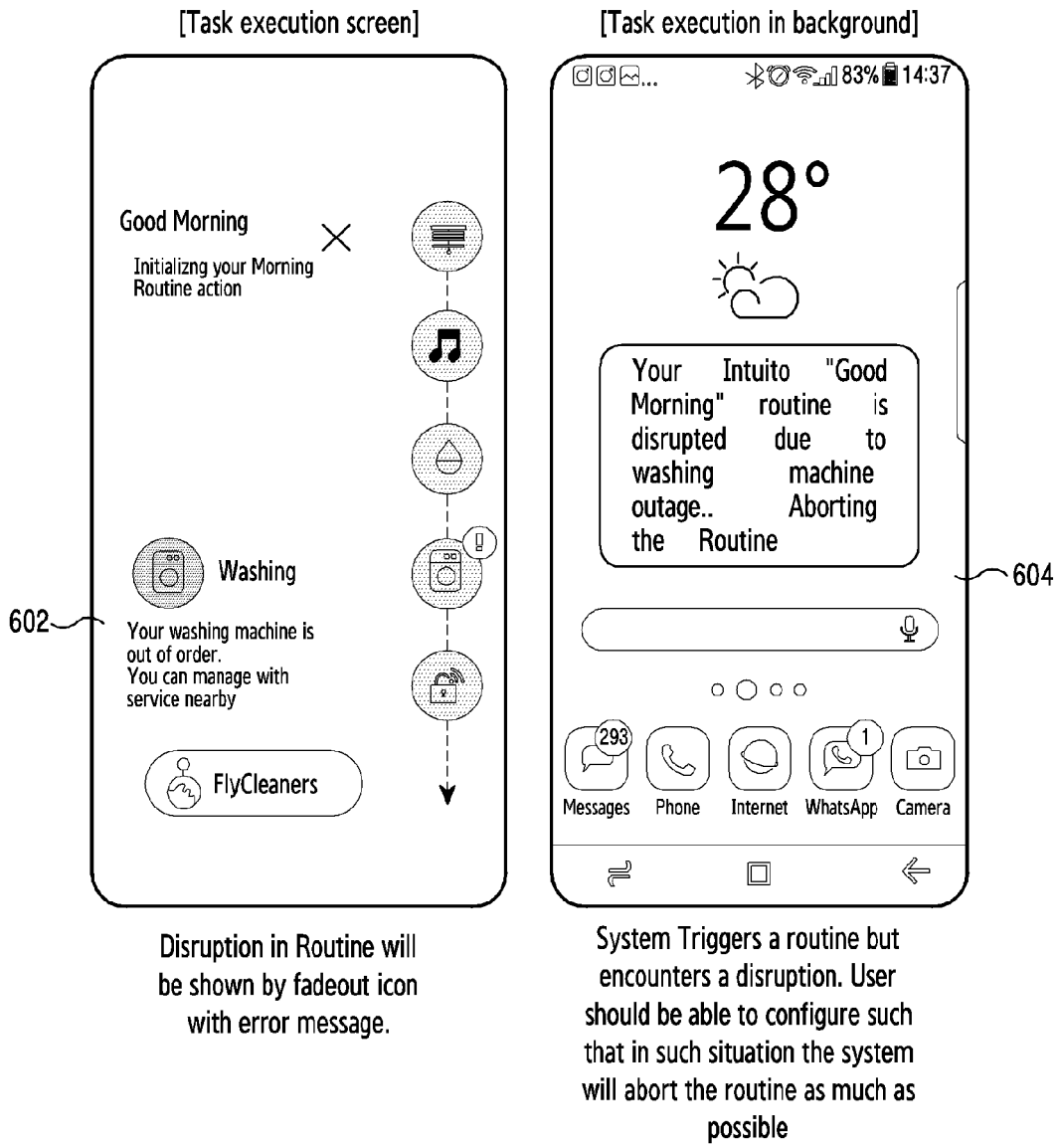

[Fig. 7]
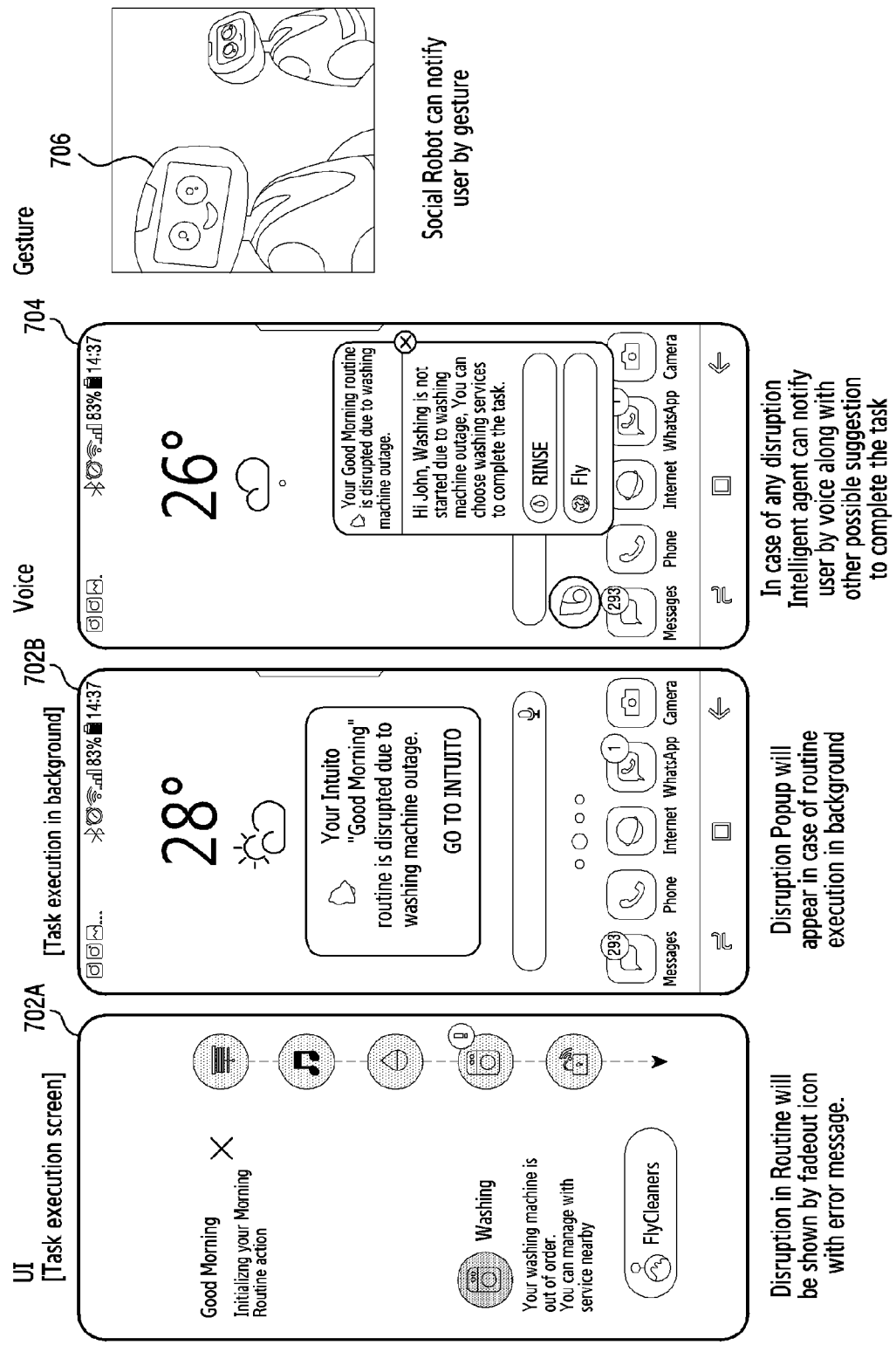

[Fig. 8]
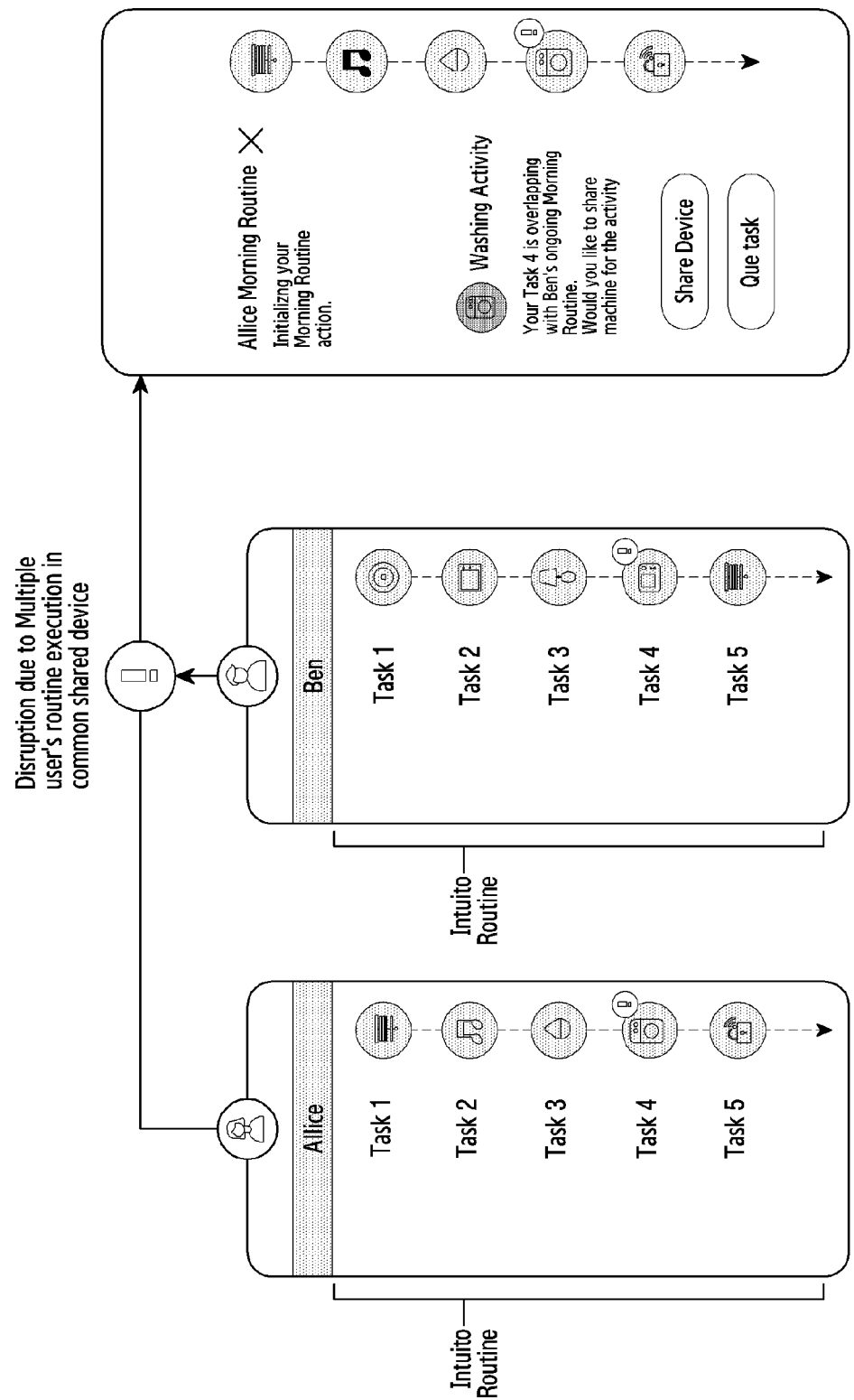

[Fig. 9]
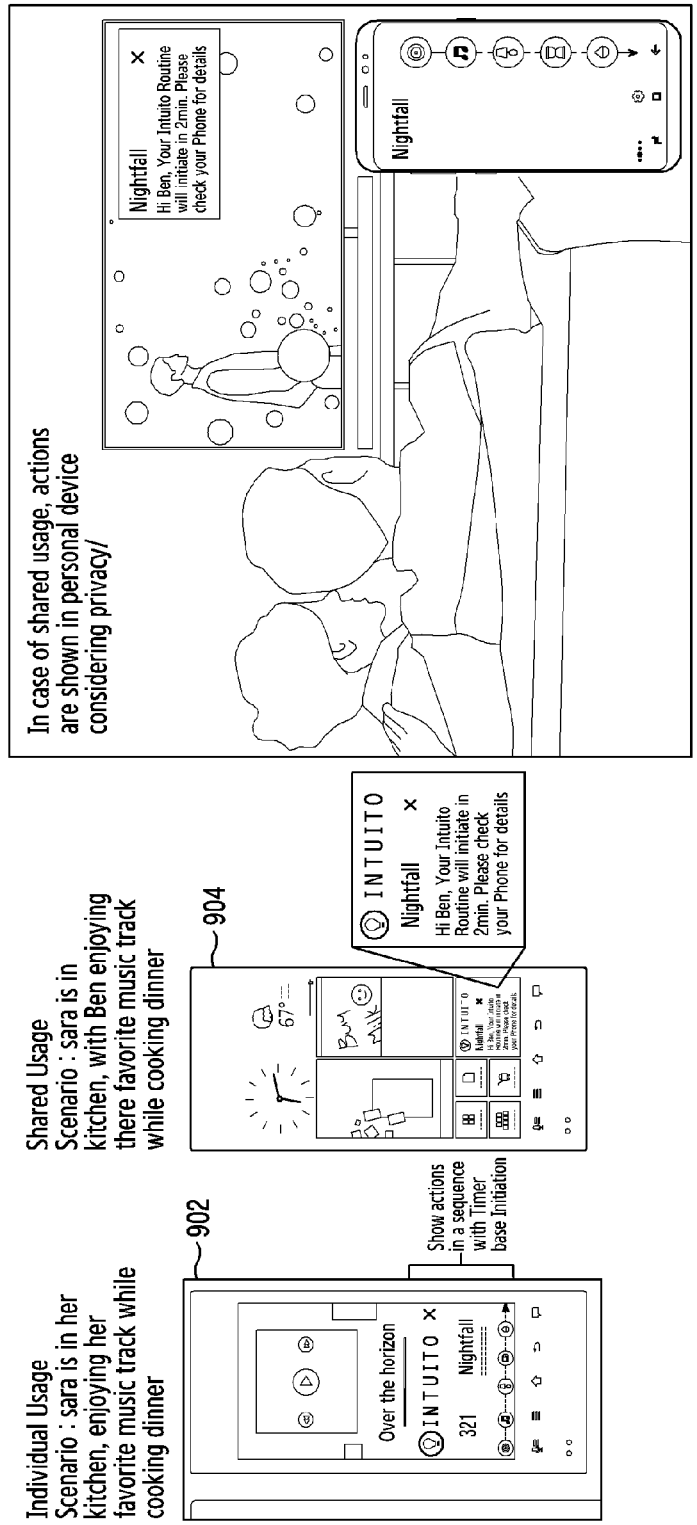

[Fig. 10]
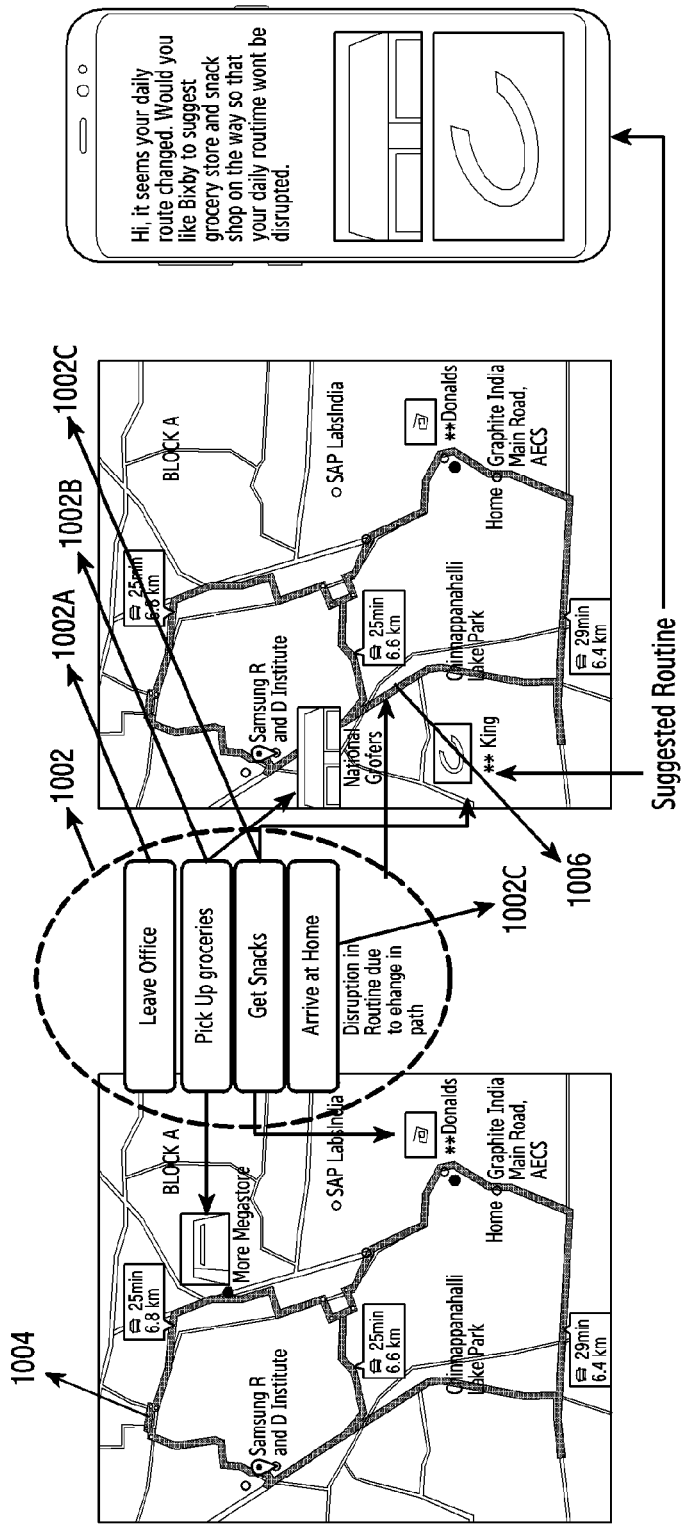

[Fig. 11]
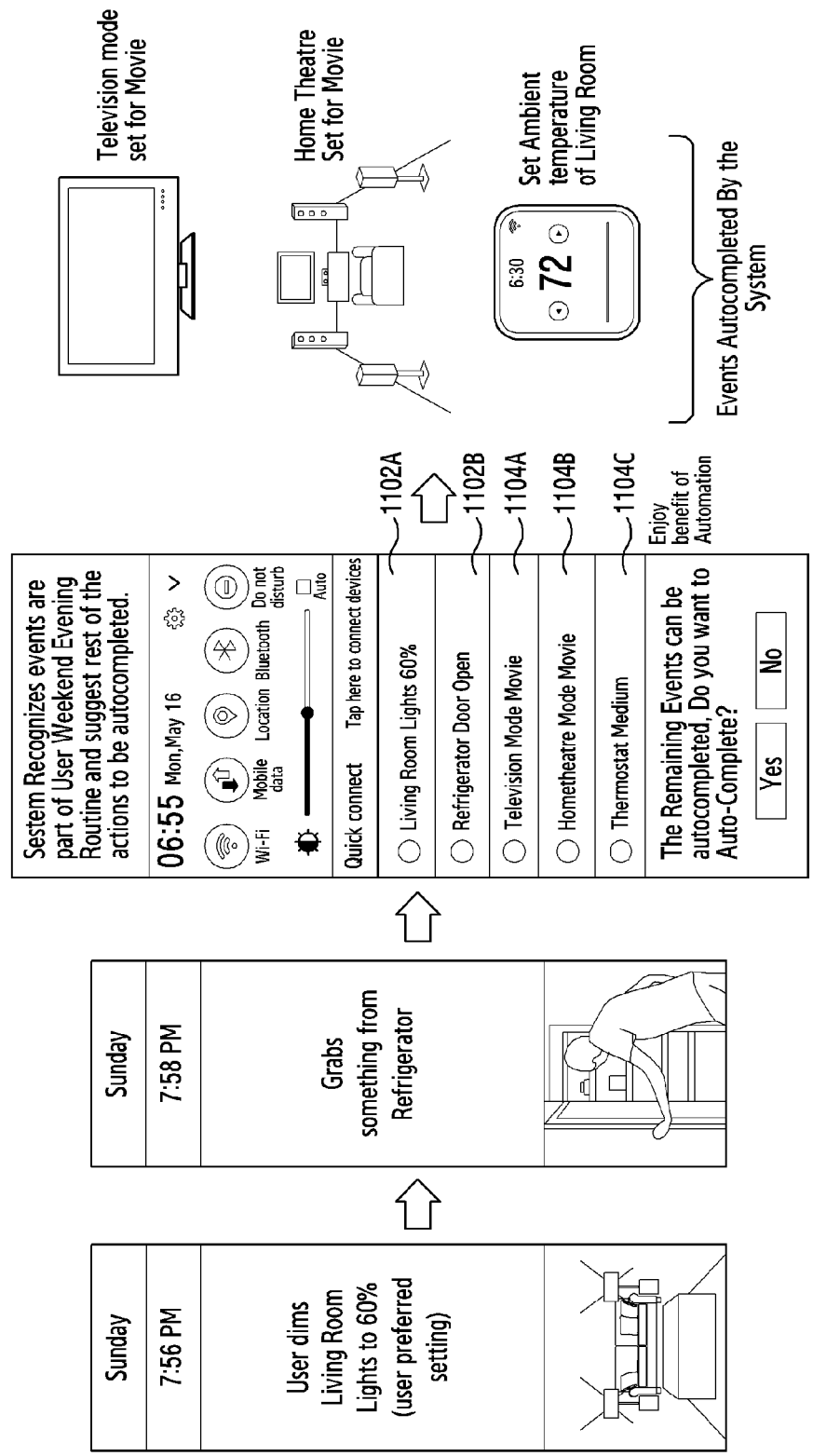

[Fig. 12]
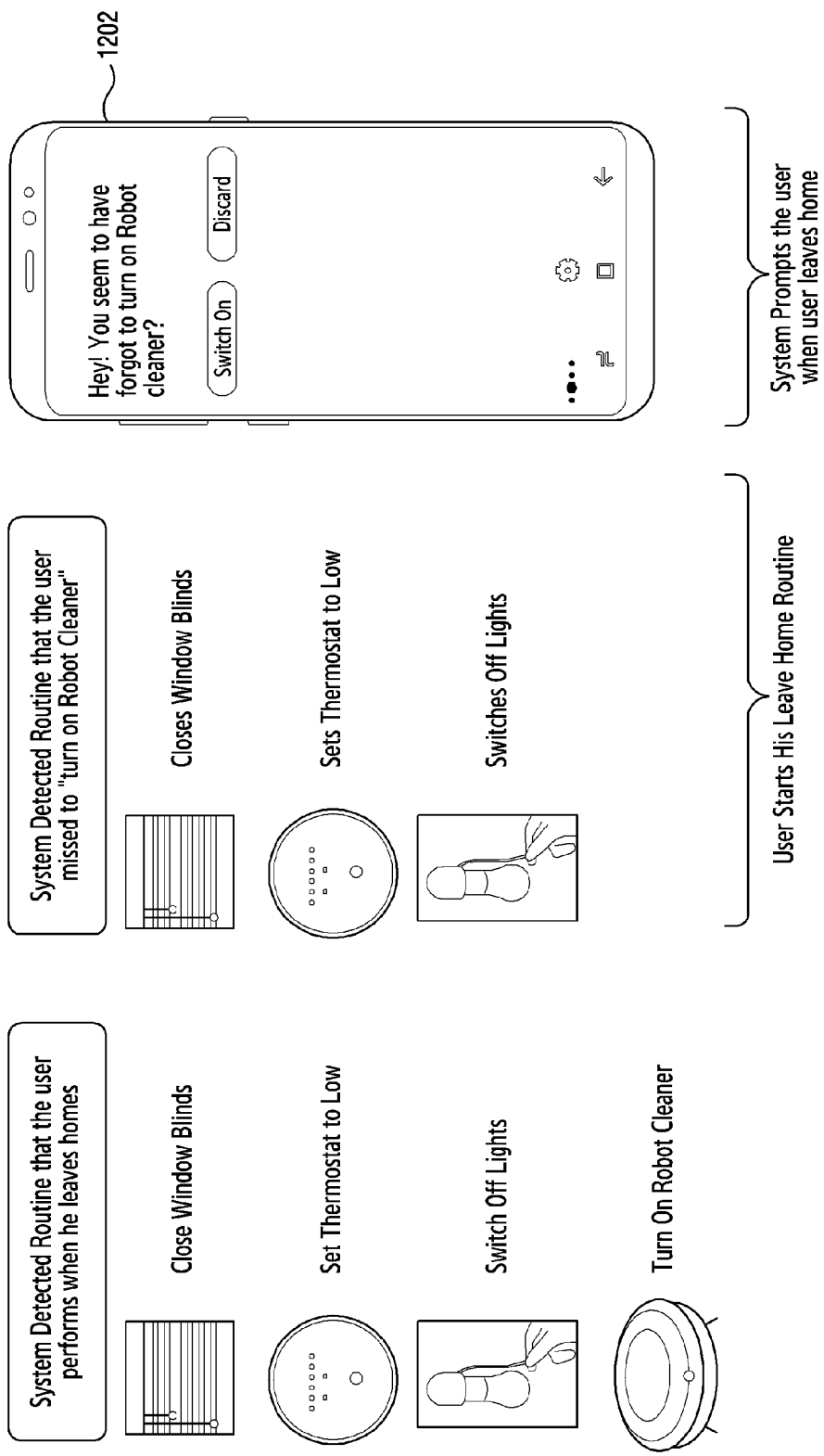

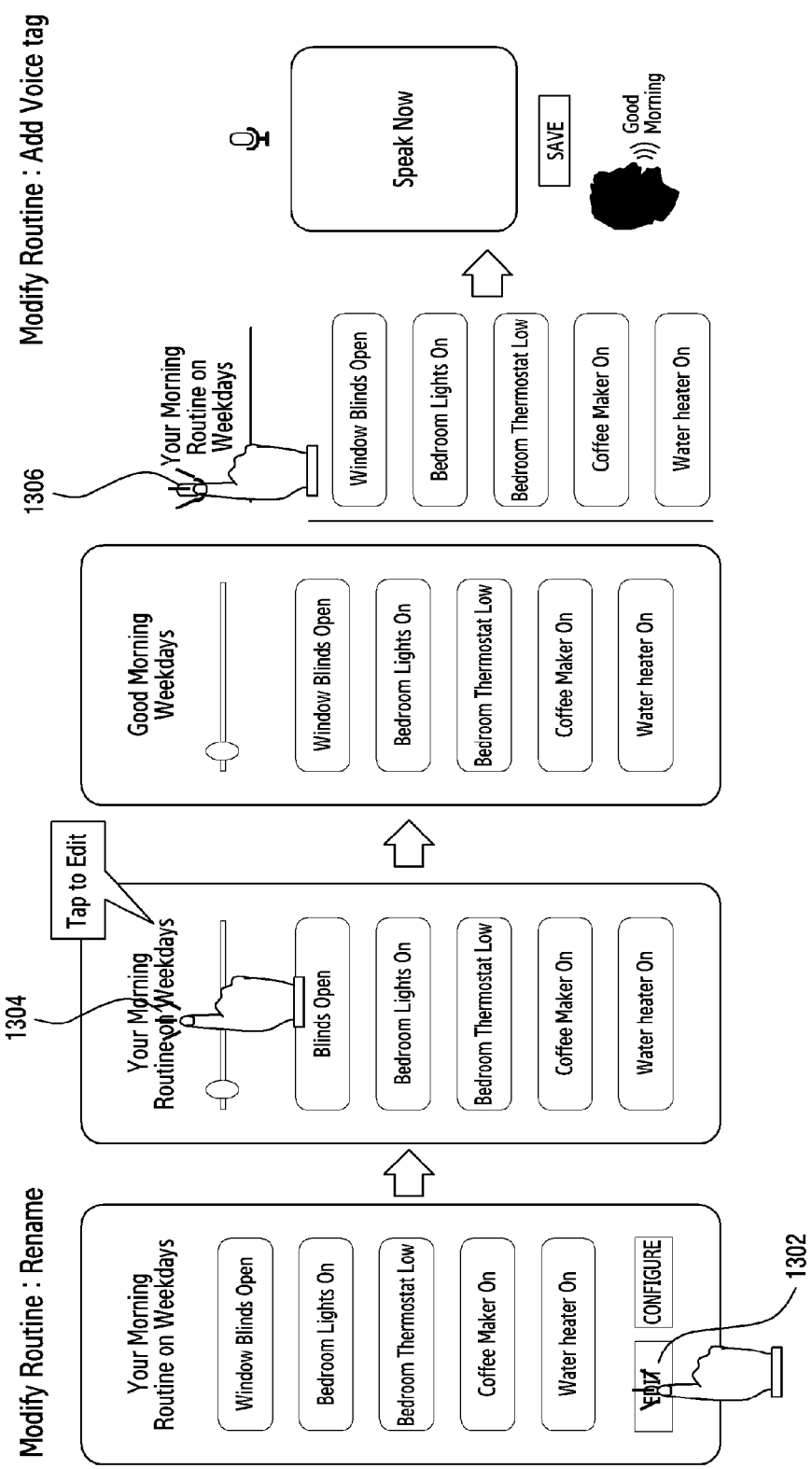
[Fig. 13]

[Fig. 14]
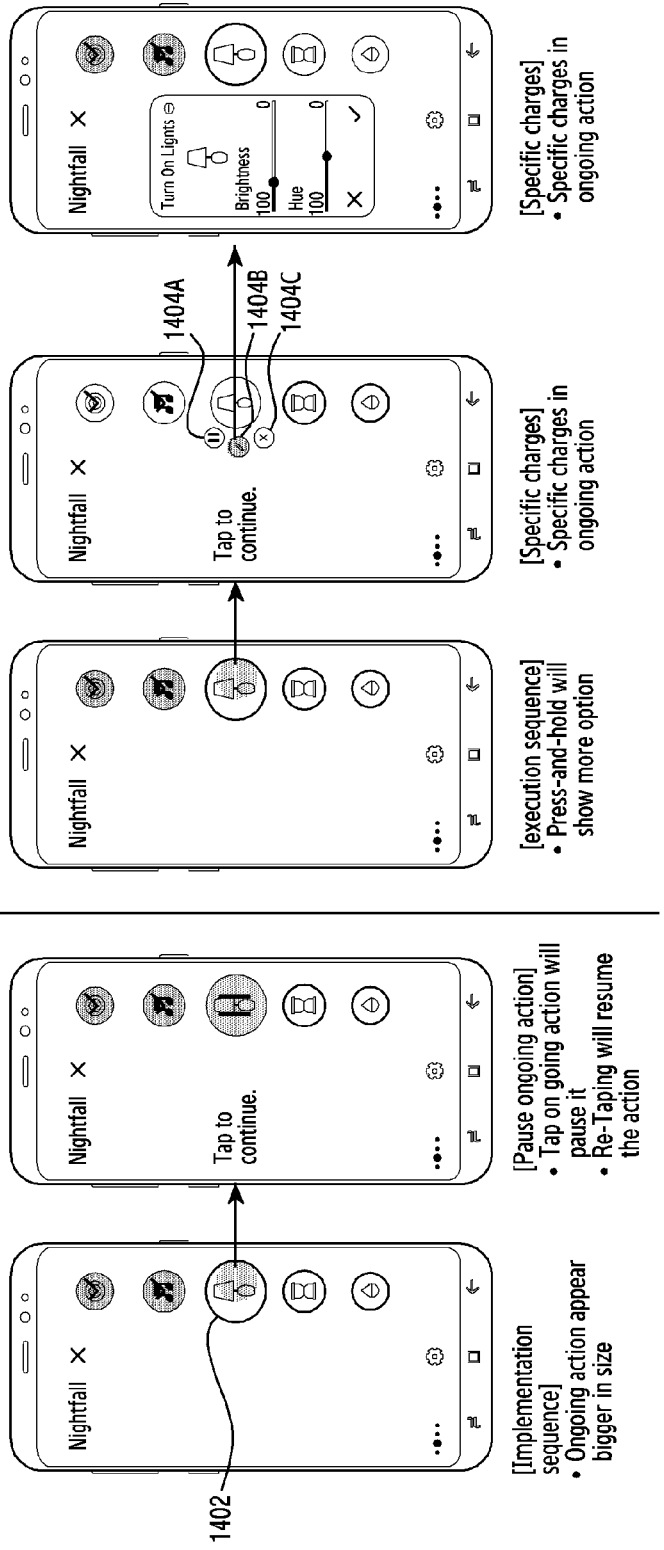

[Fig. 15]
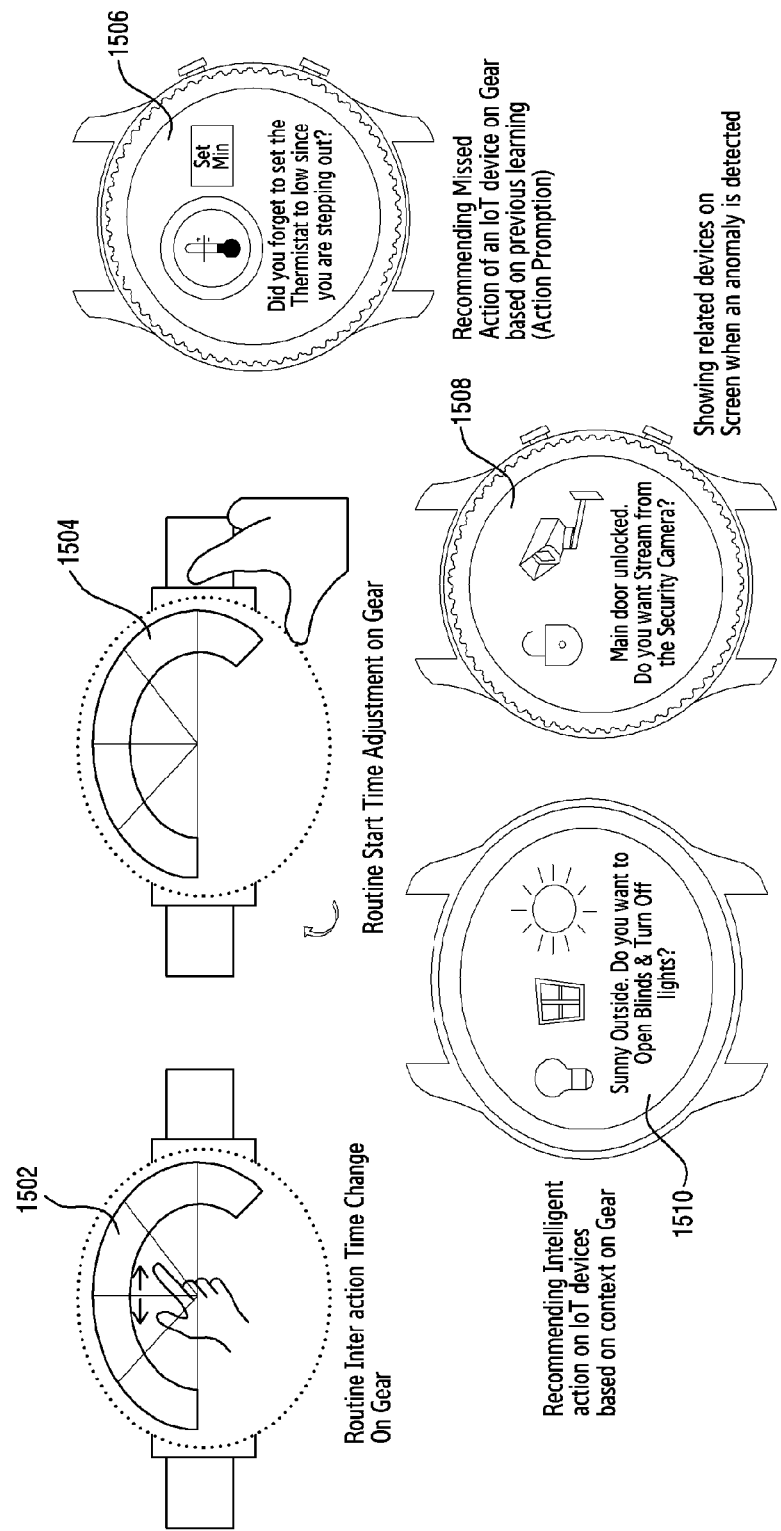

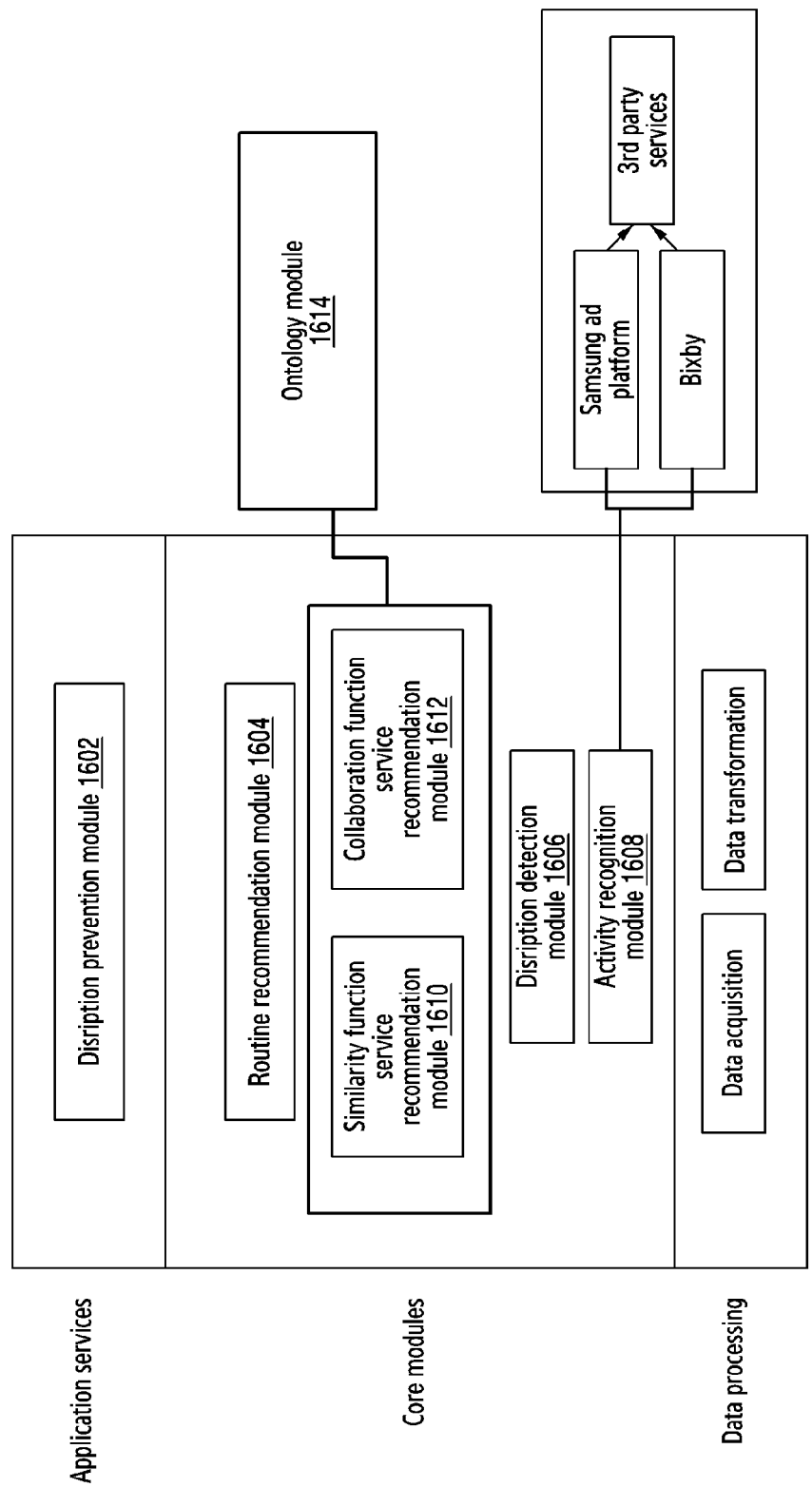
[Fig. 16]

[Fig. 17]
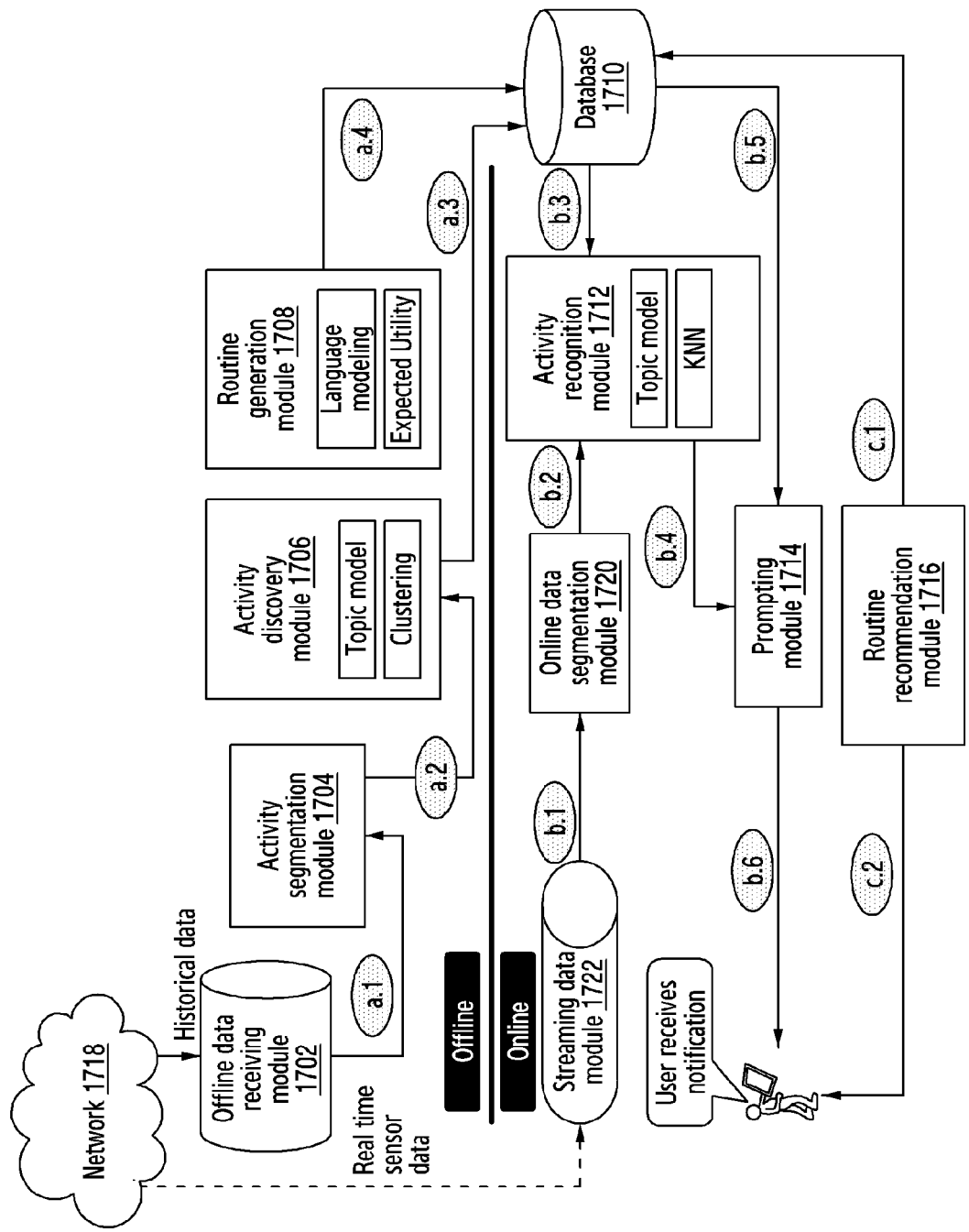

METHOD AND SYSTEM FOR ROUTINE DISRUPTION HANDLING AND ROUTINE MANAGEMENT IN A SMART ENVIRONMENT

CROSS-REFERENCE TO RELATED APPLICATIONS

This application is a 371 National Stage of international Application No. PCT/KR2018/003137, filed Mar. 16, 2018, which claims priority to Indian Patent Application No. 201741009376, filed Mar. 17, 2017, Indian Patent Application No. 201741022864, filed Jun. 29, 2017, Indian Patent Application No. 201741040037, filed Nov. 9, 2017, and Indian Patent Application No. 201741009376, filed Mar. 13, 2018, the disclosures of which are herein incorporated by reference in their entirety.

BACKGROUND

Field

The disclosure relates to managing user routine activities, and more particularly the disclosure relates to a method and system for routine disruption detection and handling.

Description of Related Art

The Internet, which is a human centered connectivity network where humans generate and consume information, is now evolving to the Internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Humans perform activities routinely day by day to fulfill their ongoing needs. Many of the user routine activities, nowadays, are performed by internet of things (IoT). internet of things (IoT) envisions a world where all the devices, things and people are connected. The most important applications of IoT are the "automation" and "intelligent services" that can be realized using the data collected and analyzed from billions of these devices. The current industry trends include automation which is provided by multiple technologies primarily based on Rule Engines. Identification of user routines and recommending a user the right users routines for managing the user's life will be immense values for human. Presently, systems also proceed with the same directions, with the plan of identifying user home routines and automatically performing the routine by user through existing systems. In such a scenario, user dependency on automated routines would be enormous. However, if any device which is part of user routine is faulty/malfunctioning would lead to user discomfort.

Therefore, there is a need to find an alternative device, person or service which can be used to act as a replacement of malfunctioning device or a service and recommend the same to the user before and during routine trigger time, so that user routine disruption can be eliminated. Further, there is a need of a system method for the prevention of disruption of user routines. Further, there is a need for the system to notify/prompt the user, when at least one of the faulty/malfunctioning is detected in the user's routine. Further, there is a need for the system to provide a user interaction to detect disruptions in the user routine and autocomplete the user routine.

SUMMARY

Embodiments of the disclosure provide method and system for routine disruption handling and routine management in a smart environment.

In one embodiment, A method for handling disruptions in a user's routine is provided, the method includes detecting, by an operating condition detection module, an operating condition of at least one of one or more device applications and one or more internet of things (IoT) devices associated with the user's routine of activities, detecting, by a disruption detection module, whether there are one or more disruptions in the operating condition of at least one of the one or more device applications and the one or more internet of things (IoT) devices, identifying, by an impact identification module, an impact on one or more activities that are caused by the one or more disruptions in the operating condition, and performing, by a disruption handling module, a disruption handling to provide a disruption solution for executing the user's routine, wherein the disruption solution is provided for a user control by a configuration option.

In another embodiment, the disruption in the user routine occurs based on factors of at least one of disruption in a device, interruption due to people, disruption in services subscribed or used, interruption due to resource limit, disruption due to external event and external factor, disruption due to external factor, environment conflict, disruption in routine management of multiple people, disruption due to user health, and disruption due to user unawareness.

In yet another embodiment, performing the disruption handling includes identifying one or more alternate EDT devices or services and recommending, by a routine recommendation module, an optimum alternate IoT device or service for completing the user's routine impacted by the disruption in the operation condition. The completion of the user's routine is performed by at least one of reassigning the one or more disrupted activities, overriding the one or more disrupted activities, queuing the one or more disrupted activities, suggesting an alternate IoT device or service, recommending an optimum IoT device or service and autocompleting the one or more disrupted activities and clubbing the one or more disrupted activities.

In yet another embodiment, performing the disruption handling includes automatically reminding the user the one or more disruptions in the operating condition of at least one of the one or more device applications and the one or more internet of things (IoT) devices based on at least one of user's history and contexts recognized over a period of time.

In yet another embodiment, performing the disruption handling further includes at least one of requesting help from a second user and allocating a task to the second user for completing the user's routine. The second user may be one or more users. One or more reasons for requesting help from at least one of the second user or the one or more users includes at least one of (a) disruption due to improper usage (e.g. Oven door not closed properly), (b) lack of resources or faulty resources no detergent in washing machine, no water in sprinkler, ingredients not available) and (c) disruption due to a user not at the designated location (e.g. when a person is not at home request the second user to record a TV show).

In yet another embodiment, performing the disruption handling further includes providing collaborative experience for the one or more users.

In yet another embodiment, the configuration option includes options of at least one of abort routine, automatic handling and prompting.

In yet another embodiment, the automatic handling of the disruption is performed based on factors of at least one of rules, intelligence and suggesting a third-party service.

In yet another embodiment, the method further includes analyzing and storing, by an activity analyzing module, at least one of time, an activity order and user particulars for the one or more activities performed by the user in the user's routine.

In yet another embodiment, recommending one or more alternate IoT devices or services further includes acquiring by an offline data receiving module, one or more activities data from a network, transforming, by an activity segmentation module, a sensor data received from the network into one or more data segments on acquiring the one or more activities data, estimating, by an activity discovery module, topic distribution for each of plurality of the data segments transformed, grouping, by the activity discovery module, topically the similar data segments into agglomerative clustering, generating, by a routine generation module, a user's routine based on the clustered one or more data segments by at least one of language modelling and an expected utility, determining, by an activity recognition module, an order in which sensor data are triggered for a particular activity cluster based on recurrent patterns, recognizing, by the activity recognition module, the one or more activities based on the one or more data segments grouped topically and k-nearest neighbors (KNN), prompting, by a prompting module, one or more activities that are missed, left or uncompleted in the user's routine to a user based on the order determined, and recommending one or more alternate IoT devices or services to the user based on the order determined.

In yet another embodiment, the prompting the one or more activities that are missed, disrupted or uncompleted in the user's routine is performed using at least one of a user interface (UI) based interaction, a voice based interaction and a gesture based interaction.

In yet another embodiment, performing the disruption handling further includes determining the one or more activities that are left missed or uncompleted in the user's routine based on at least one of user's history and contexts using at least one of a machine learning technique and a natural language processing technique, predicting one or more succeeding activities of the user's routine that the user intends to perform using probabilistic models, and automatically prompting a user to autocomplete the one or more activities that are left missed, uncompleted and intended activities to be completed first. The one or more activities that are left missed, uncompleted and intended activities to be completed first in the user's routine are detected based on at least one of the user's history and the contexts.

In yet another embodiment, performing the disruption handling further includes providing a user interface based interaction to modify the user's routine of activities. The modifying the user's routine of activities includes at least one of modifying routine parameters, modifying configuration parameters of the one or more IoT devices associated with the user's routine, changing a sequence of tasks in the user's routine and changing an interval between tasks in the user's routine and deleting the user's routine.

In yet another embodiment, the routine disruption handling and routine management unit allows the user to personalize and customize a user interface. The personalization/customization includes at least one of embedding user image and embedding voice on the user interface and further displaying cartoon characters on a display for better engagement.

In yet another embodiment, the disruption in the device includes at least one of device out of order, conflicting states, shared usage of the one or more IoT devices by one or more users and cross device activity.

In yet another embodiment, the interruption due to people comprises at least one of guest presence and crossed higher priority family member routine with the user routine.

In yet another embodiment, the disruption in the service comprises service down by a third-party service provider.

In yet another embodiment, the interruption due to resource limit includes at least one of unavailability of internet, insufficient device storage, less battery charge, power fluctuation or current activity execution time scheduled for unexpected event.

In yet another embodiment, the disruption due to external event and external factor includes at least one of power management, mood and weather conditions.

In yet another embodiment, the environment conflict includes at least one of path change during a commute to location due to construction, interruption by nearby devices and interruption due to occurrence and execution of other routine.

In yet another embodiment, the disruption due to user unawareness includes at least one of misconfiguration and change of user's location at the time of execution of the routine.

In yet another embodiment, a routine disruption handling and routine management unit for detecting and handling disruptions in a user's routine is provided. The routine disruption handling and routine management unit includes an operating condition detection module that detects operating condition of at least one of one or more device applications and one or more internet of things (IoT) devices associated with the user's routine of activities, a disruption detection module that detects one or more disruptions in the operating condition of at least one of the one or more device applications and the one or more internet of things (IoT) devices, an impact identification module that identifies an impact on one or more activities that are caused by the one or more disruptions, and a disruption handling module that performs a disruption handling to provide a disruption solution for executing the user's routine. The disruption solution is provided for a user control by a configuration option.

In yet another embodiment, the routine dis on handling and routine management unit further includes an activity analyzer module that analyzes and stores initially the one or more activities performed by a user in the user's routine, a routine recommendation module that recommends an optimum IoT device or service for completing the user's routine impacted by the one or more disruptions in the operation condition, and a prompting module that automatically prompts the user to enable autocompleting the one or more activities, of at least one of left missed, uncompleted and user intended in the user's routine, based on at least one of the user's history and the contexts.

In yet another embodiment, a method for operating an apparatus is provided. The method includes detecting, an operating condition of at least one of device applications and internet of things (IoT) devices associated with a routine of user activities; detecting disruptions in the operating condition of the at least one of the device applications and the IoT devices; identifying an impact on the user activities that are caused by the disruptions; and performing a disruption handling to provide a disruption solution for executing the routine of user activities.

The foregoing has outlined, in general, the various aspects of the invention and is to serve as an aid to better understand the more complete detailed description which is to follow. In reference to such, there is to be a clear understanding that the disclosure is not limited to the method or application of use described and illustrated herein. It is intended that any other advantages and objects of the disclosure that become apparent or obvious from the detailed description or illustrations contained herein are within the scope of the disclosure.

A method and an apparatus according to various embodiments of the disclosure allows elimination and prevention of user routine disruption, and provides a user interaction to detect disruptions in the user routine and autocomplete the user routine.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 1 is a schematic diagram illustrating a plurality of internet of things (IoT) devices or applications, according to an embodiment of the present invention.

FIG. 2 is a schematic diagram illustrating a use case for suggesting at least one of an alternate IoT device and a service to a user, according to an embodiment of the present invention.

FIG. 3 is a schematic diagram illustrating a use case for allocating one or more user activities to at least one of a second user or one or more users, according to an embodiment of the present invention.

FIG. 4 is a block diagram illustrating one or more functional components of a routine disruption handling and routine management unit, according to an embodiment of the present invention.

FIG. 5 is a schematic flow diagram illustrating a method for detecting one or more disruptions in a user's routine and performing a routine disruption handling, according to an embodiment of the present invention.

FIG. 6 is a schematic diagram illustrating a use case depicting a real-time execution screen and a background execution screen of execution of a user's routine, according to an embodiment of the present invention.

FIG. 7 is a schematic diagram illustrating a use case that depicts various ways of prompting a user, according to an embodiment of the present invention.

FIG. 8 is a schematic diagram illustrating a disruption in a user's routine due to overlap of one or more user's routine in a common IoT device, according to an embodiment of the present invention.

FIG. 9 is a schematic diagram illustrating a use case of shared usage of one or more users on an IoT device for executing user's routine, according to an embodiment of the present invention.

FIG. 10 is a schematic diagram illustrating a use case of a dynamic routine management suggesting an alternate route due to change in path, according to an embodiment of the present invention.

FIG. 11 is a schematic diagram illustrating a use case of analyzing a user's routine and prompting a user for autocompleting the user's routine, according to an embodiment of the present invention.

FIG. 12 is a schematic diagram illustrating a use case prompting one or more missing activities to a user, according to an embodiment of the present invention.

FIG. 13 is a schematic diagram illustrating a UI based interaction for editing a user's routine name and adding a voice tag, according to an embodiment of the present invention.

FIG. 14 is a schematic diagram illustrating a use case of a UI based interaction for overriding an ongoing user activity of a user's routine in real-time, according to an embodiment of the present invention.

FIG. 15 is a schematic diagram illustrating a use case of handling routine disruption on a gear device, according to an embodiment of the present invention.

FIG. 16 is a schematic diagram illustrating an architecture diagram of a routine disruption handling and routine management unit, according to n embodiment of the present invention.

FIG. 17 is a schematic diagram illustrating a data flow pipeline of handling routine disruption, according to an embodiment of the present invention

DETAILED DESCRIPTION

The disclosure describes a method and system for routine disruption handling and routine management in a smart environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the disclosure. The following detailed description is, therefore, not to be taken in a limiting sense, and the scope of the disclosure is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein and the various features and advantages details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The disclosure describes a method and system for routine disruption handling and routine management in a smart environment. The smart environment includes at least one of, but not limited to, IoT devices, device applications and/or any IoT enabled personal digital assistances. At first, one or more activities performed by a user in his/her daily routine is analyzed and recorded/stored by a routine disruption handling and routine management unit in offline. Then the routine disruption handling and routine management unit detects operating condition of one or more activities and determines for one or more disruptions in the user's routine while executing the user's routine. The routine disruption handling and routine management unit further prompts the user with notification upon detection of the one or more disruptions in the user's routine and recommends at least one of shared usage of common IoT device, an alternate optimum IoT device or service, autocompleting of the one or more activities that are yet to be completed.

FIG. 1 is a schematic diagram illustrating a plurality of internet of things (IoT) application domains, according to an embodiment of the disclosure. According to FIG. 1, a routine disruption handling and routine management unit depicts a plurality of IoT devices or applications 102A-N to a user once the user's routine is initiated/activated for execution. The plurality of IoT devices or applications 102N are a part of a user's routine to execute one or more activities in the user's routine. The routine disruption handling and routine management unit further depicts a routine disruption notification 104 to the user when at least one of the one or more activities are disrupted due to malfunctioning of at least one of the plurality of IoT devices or applications 102A-N.

In an embodiment, one or more disruptions are occurred based on factors. The factors include at least one of a disruption in a device, interruption due to people, disruption in services subscribed or used, interruption due to resource limit, disruption due to external event, disruption due to external factor, environment conflict, disruption in routine management of multiple people, disruption due to user health and disruption due to user unawareness. The disruption in the device includes at least one of device out of order, conflicting states, shared usage of the one or more IoT devices by one or more users and cross device activity. The interruption due to people includes at least one of guest presence and crossed higher priority family member routine with the user's routine.

The disruption in services subscribed or used includes service down by a third-party service provider. The interruption due to resource limit includes at least one of unavailability of internet, insufficient device storage and less battery charge. The interruption due to resource limit includes at least one of unavailability of internet, insufficient device storage and less battery charge. The disruption due to external event includes at least one of a power fluctuation and current activity execution tune scheduled for unexpected event. The disruption due to the external factor comprises at least one of power management, mood and weather conditions. The environment conflict includes at least one of path change due to construction, interruption by nearby devices and interruption due to occurrence and execution of other routine. The disruption due to user unawareness includes at least one of misconfiguration and change of user's location at the time of execution of the routine. In an embodiment, the interruption due to people is further occurred based on factors of at least one of conflict due to privacy, and conflict due to multiple people trying to utilize same IoT device.

FIG. 2 is a schematic diagram illustrating a use case for suggesting at least one of an alternate IoT device and a service to a user, according to an embodiment of the disclosure. According to this embodiment, a routine disruption handling and routine management unit provides a routine disruption notification 202A-B to the user and suggests at least one of the alternate IoT device and the service 204A-B to the user in case of malfunctioning or disruption detected in at least one of the IoT devices associated with the user's routine. For a first instance, the routine disruption handling and routine management unit suggests an alternate IoT device (e.g. mobile) for the user's necessity and continue the user's routine when a home theatre associated with the user's routine is detected malfunctioned. For a second instance, the routine disruption handling and routine management unit suggests a Fly cleaners service for washing user's clothes and continue the user's routine when a washing machine associated with the user's routine is detected malfunctioned.

FIG. 3 is a schematic diagram illustrating a use case for allocating one or more user activities to at least one of a second user or one or more users, according to an embodiment of the disclosure. According to this embodiment, a routine disruption handling and routine management unit provides an allocate task option 302 via a user interface to a user. The allocate task option 302 is provided to the user to allocate a disrupted user activity to at least one of a second user or one or more users. The second user may be at least one of a friend, a family member and a known person sharing a same shared smart environment of the user. The routine disruption handling and routine management unit further provides an assigned task notification 304 to at least one of the second user or the one or more users. In an embodiment, the allocation of the one or more user activities is performed in order to enhance experience and increase productivity of the user. In another embodiment, the allocation of the one or more user activities to at least one of the second user or the one or more users is performed to share the user's routine commonly by multiple users.

FIG. 4 is a block diagram illustrating one or more functional components of a routine disruption handling and routine management unit, according to an embodiment of the disclosure. According to this embodiment, the routine disruption handling and routine management unit includes an operating condition detection module 402, a disruption detection module 404, an impact identification module 406, a disruption handling module 408 and a routine recommendation module 410 and a database 424. The operating condition detection module 402 detects an operating condition of at least one of one or more device applications and one or more internet of things (IoT) devices associated with the user's routine of activities. The disruption detection module 404 detects one or more disruptions in the operating condition of at least one of the one or more device applications and the one or more internet of things (IoT) devices. The impact identification module 406 identifies an impact on one or more activities that are caused by the one or more disruptions in the operating condition. The disruption handling module 408 performs a disruption handling to provide a disruption solution for executing the user's routine. In an embodiment, the disruption solution is provided for a user control by a configuration option.

The routine recommendation module 410 includes an offline data receiving module 412, an activity segmentation module 414, an activity discovery module 416, a routine generation module 418, an activity recognition module 420 and a prompting module 422. The offline data receiving module 412 acquires one or more activities data from a network. The network may be an IoT cloud. The activity segmentation module 414 transforms a sensor data received from the network into one or more data segments on acquiring the one or more activities data. The activity discovery module 416 estimates topic distribution for each of plurality of the data segments transformed. The activity discovery module 416 groups topically the similar data segments into agglomerative clustering. The routine generation module 418 generates a user's routine based on the clustered one or more data segments by at least one of language modelling and an expected utility. The activity recognition module 420 determines an order in which sensor data are triggered for a particular activity cluster based on recurrent patterns the sensor data received from the network. The activity recognition module 420 recognizes the one or more activities based on the one or more data segments grouped topically and k-nearest neighbors (KNN). The prompting module 422 is adapted to prompt one or more activities that are missed, left or uncompleted in the user's routine to a user based on the order determined and recommends one or more alternate devices or services to the user based on the order determined.

FIG. 5 is a schematic flow diagram illustrating a method for detecting one or more disruptions in a user's routine and performing a routine disruption handling, according to an embodiment of the disclosure. At step 502, an operating condition of at least one of one or more device applications and one or more internet of things (IoT) devices associated with the user's routine of activities are determined. At step 504, one or more disruptions in the operating condition of at least one of the one or more device applications and the one or more internet of things (IoT) devices are detected. At step 506, identifying an impact on one or more activities that are caused by the disruption in the operating condition. At step 508, a disruption handling is performed to provide a disruption solution for executing the user's routine. In an embodiment, the disruption solution is provided for a user control by a configuration option. In another embodiment, a notification is sent to remind the user that there are one or more disruptions in the operating condition of at least one of the one or more device applications and the one or more internet of things (IoT) devices. At step 510, a routine recommendation is provided to the user by recommending one or more alternate optimum IoT devices or services to complete the user's routine.

FIG. 6 is a schematic diagram illustrating a use case depicting a real-time execution status screen and a background execution status screen of execution of a user's routine, according to an embodiment of the disclosure. According to this embodiment, a routine disruption handling and routine management unit depicts a real-time execution status screen 602 and a background execution status screen 604 that provides current status of execution of the user's routine.

FIG. 7 is a schematic diagram illustrating a use case that depicts various ways of prompting a user, according to an embodiment of the disclosure. According to this embodiment, a routine disruption handling and routine management unit prompts the user by at least one of a user interface (UI) based interaction, a voice based interaction 704 and a gesture based interaction 706. The UI based interaction includes at least one of a real-time prompting 702A and a background pop-up prompting 702B. The gesture based interaction is performed by providing gestures via social robots. The voice based interaction prompts the user by voice along with an optimum alternate IoT device or service to complete the user's routine.

The user interface based interaction is adapted to modify the user's routine of activities. The modification of the user's routine includes at least one of modifying routine parameters, modifying configuration parameters of the one or more IoT devices associated with the user's routine, changing a sequence of tasks in the user's routine, and changing an interval between tasks in the user's routine and deleting the user's routine.

FIG. 8 is a schematic diagram illustrating a disruption in a user's routine due to overlap of one or more user's routine in a common IoT device, according to an embodiment of the disclosure. According to this embodiment, a routine disruption handling and routine management unit analyzes overlap of a particular user activity (e.g. Washing) of a first user (e.g. Alice) and a second user (e.g. Ben) on sharing a common IoT device. The routine disruption handling and routine management unit further notifies the first user (e.g. Alice) and the second user Ben) the overlap of the particular user activity (e.g. Washing) and unavailability of the common IoT device and further suggests the first user and the second user to share the common IoT device for the particular user activity.

FIG. 9 is a schematic diagram illustrating a use case of shared usage of one or more users on an IoT device for executing user's routine, according to an embodiment of the disclosure. According to this embodiment, an individual usage of the MT device by a first user (e.g. Sara) is depicted in 902, and a shared usage of the IoT device by the first user (e.g. Sara) and a second user (e.g. Ben) depicted in 904. The routine management unit further manages privacy of the first user and the second user individually by prompting the one or more user activities in their respective personal devices. In case of Individual usage, the routine management unit displays or prompts the one or more user activities on at least one of a common IoT device or a personal IoT device. However, in case of shared usage, the routine management unit displays or prompts the one or more user activities on the personal IoT device considering various factors of at least one of privacy and user convenience.

In one embodiment, the routine disruption handling and routine management unit provides the disruption handling by at least one of aborting routine completely/partially as depicted in FIG. 7 and prompting user to take an action as depicted in FIG. 9. The routine disruption handling and routine management unit further provides automatic handling the one or more disruptions in the user's routine by at least one of rules, intelligence and third-party services. In an embodiment, the rules are preset based on type of conflicts caused due to the one or more disruptions in the user's routine. The routine disruption handling and routine management unit provides possible solutions for the respective conflict based on the rules preset. The routine disruption handling and routine management unit further performs the disruption handling based on the intelligence fed. The intelligence includes at least one of (a) Knowledge bases and (b) skillful assisting assistants. The routine disruption handling and routine management unit further performs the disruption handling by suggesting the third-party services. The third-party services include any service providers (e.g. amazon, Fly cleaners, cafe coffee day, etc.).

In case of rules automatic handling the one or more disruptions (e.g. resolving method of conflict) can be dependent on the type of conflict. For example: in case of disruption due to shared device usage like washing machine by a second user or multiple users, the routine disruption handling and routine management unit choose to club schedule the user activity. However, in case the IoT device is thermostat, the routine disruption handling and routine management unit can choose middle ground or perform gamification. Such a decision by the routine disruption handling and routine management unit are performed using knowledge bases or ontology. Even skillful assistant can help in taking these decisions. The routine disruption handling and routine management unit also choose to perform the disruption handling (e.g. resolve conflict) by 3rd party services. (e.g. in case of washing machine out of order, the routine disruption handling and routine management unit can choose to set up laundry services). The routine disruption handling and routine management unit also learn the IoT device behavior and predict future disruptions in the user's routine for providing advertisements and other purposes.

In another embodiment, the routine disruption handling and routine management unit performs the disruptions handling automatically by predicting one or more succeeding activities of the user's routine that the user intends to perform using probabilistic models, and automatically prompting a user to enable autocompleting the one or more activities of at least one of left missed, uncompleted and user intended in the user's routine based on at least one of the user's history and the contexts FIG. 10 is a schematic diagram illustrating a use case of a dynamic routine management suggesting an alternate route due to change in path, according to an embodiment of the disclosure. Consider a scenario in which a user' routine 1002 of leaving office to reaching home depicted in FIG. 10 gets disrupted due to change in path. The user' routine 1002 includes leaving office 1002A, picking up groceries 1002B from a first supermarket (e.g. More megastore), buying snacks 1002C from a first restaurant (e.g. McDonalds) and arriving home in a first normal path 1004. According to the above scenario, a routine disruption handling and routine management unit handles the routine disruption by suggesting a second path 1006 dynamically for his/her destination in which the user can pick up groceries a second supermarket (e.g. National Groceries) and buys snacks from a second restaurant (e.g. Burger King) and arrive at home completing the user's routine. In an embodiment, the second path 1006, the second supermarket and the second restaurant are recommended to the user based on user's history and contexts. In an embodiment, the disruption handling and routine management unit prompts and suggest the user via voice based interaction.

FIG. 11 is a schematic diagram illustrating a use case of analyzing a user's routine and prompting a user for autocompleting the user's routine, according to an embodiment of the disclosure. According to this embodiment, a disruption handling and routine management unit analyzes the user's routine and prompts the user the one or more activities that are completed 1102 A-B and left uncompleted 1104A-C. The disruption handling and routine management unit further analyzes whether autocompletion can be enabled for the one or more activities that are left completed 1104A-C based on one or more IoT devices associated and allows the user to enable autocompletion of the one or more activities left uncompleted 1104A-C.

FIG. 12 is a schematic diagram illustrating a use case prompting one or more missing activities to a user, according to an embodiment of the disclosure. According to this embodiment, the disruption handling and routine management unit analyzes the user's routine and prompts with a notification 1202 to the user with the one or more activities missed and allows the user to execute the one or more activities missed.

FIG. 13 is a schematic diagram illustrating a UI based interaction for editing a user's routine name and adding a voice tag, according to an embodiment of the disclosure. Consider a scenario in which a user needs to edit the user's routine name and add the voice tag to the user's routine. According to this embodiment, a routine disruption handling and routine management unit provides an edit option 1302 to the user to edit the user's routine name. The routine disruption handling and routine management unit further allows the user to tap on the user's routine name 1304 to tap and edit the user's routine name 1304. The routine disruption handling and routine management unit further allows the user to tap on an Mic option 1306 and add the voice tag and save to the user's routine.

FIG. 14 is a schematic diagram illustrating a use case of UI based interaction for overriding an ongoing activity 1402 of a user's routine in real-time, according to an embodiment of the disclosure. According to this embodiment, a routine disruption handling and routine management unit analyzes the ongoing activity 1402 to be executed in the user's routine. In an embodiment, a routine disruption handling and routine management unit depicts the ongoing action 1402 icon bigger in size. The routine disruption handling and routine management unit further allows a user to pause and resume the ongoing action by tapping/clicking on the ongoing action 1402 icon. The routine disruption handling and routine management unit further allows the user to long-press and hold on the ongoing action 1402 icon to modify the execution of the ongoing action 1402. One or more options for modifying the execution of the ongoing action 1402 are provided to the user accordingly to the user to make specific changes when the user long-presses and holds on the ongoing action 1402. The one or more options include edit 1404A, pause 1404B and abort 1404C. The edit option 1404A allows the user to make specific changes on the ongoing action 1402.

FIG. 15 is a schematic diagram illustrating a use case of handling routine disruption on a gear device, according to an embodiment of the disclosure. According to this embodiment, FIG. 1502 depicts routine interaction time change on the gear device by a user. FIG. 1504 depicts routine start time adjustment on the gear device by the user. FIG. 1506 depicts a routine disruption handling and routine management unit recommending/suggesting one or more missed activities of an IoT device on the gear device based on previous learning. FIG. 1508 depicts the routine disruption handling and routine management unit showing user's routine associated IoT devices on a screen of the gear device when one or more disruptions (e.g. suggests a user to stream security camera when main door kept unlocked) are detected. FIG. 1510 depicts the routine disruption handling and routine management unit recommending one or more activities intelligently on the IoT devices associated (e.g. to open window blinds and turn off lights when sunny outside) based on context of the gear device.

FIG. 16 is a schematic diagram illustrating an architecture diagram of a routine disruption handling and routine management unit, according to an embodiment of the disclosure. According to this embodiment, the routine disruption handling and routine management unit includes a disruption prevention module 1602 in application services domain. The disruption prevention module 1602 analyzes a user's routine for one or more disruptions and prevents the one or more disruptions in the user's routine by instantly prompting the user. The routine disruption handling and routine management unit further includes a routine recommendation module 1604, a disruption detection module 1606 and an activity recognition module 1608 in core domain. The routine recommendation module 1604 further includes a similarity function service recommendation module 1610 and a collaborative function service recommendation module 1612. The similarity function service recommendation module 1610 detects and recommends similar alternate optimum IoT device or service for a user to complete the user's routine when disruption is found in similar user activity.

The collaborative function service recommendation module 1612 recommends and allows the multiple users to collaboratively share the alternate optimum IoT device or service based on at least one of rules, ontologies, knowledge bases, 3rd party services and skillful assistants as described above. The routine disruption handling and routine management unit further includes an ontology module 1614. The ontology module 1614 provides at least one of the intelligence and the knowledge base to choose possible solutions and decides the optimum solution based on type of conflicts or disruptions in the user's routine. The ontology module 1614 provides the intelligence or the knowledge base for at least one of (a) location ontology, (b) person ontology and (c) object ontology. The location ontology analyzes location instances and spatial layout of a smart environment for which the disruption handling is to be performed. The object ontology and the person ontology focus on relations at class level in the smart environment.

The disruption detection module 1606 detects one or more disruptions in the operating condition of at least one of the one or more device applications and the one or more internet of things (IoT) devices associated with the user's routine. The activity recognition module 1608 determines an order in which sensor data are triggered for a particular activity cluster based on recurrent patterns the sensor data received from a network. The activity recognition module 1608 recognizes the one or more activities that are yet to be completed and further instructs a prompting unit to prompt the user by recommending at least one of a third-party service provider or the alternate optimum IoT device or service. The routine disruption handling and routine management unit further includes a data acquisition module and a data transformation module.

FIG. 17 is a schematic diagram illustrating a data flow pipeline of handling routine disruption, according to an embodiment of the disclosure. According to this embodiment, a routine disruption handling and routine management unit includes an offline data receiving module 1702, an activity segmentation module 1704, an activity discovery module 1706, a routine generation module 1708, a database 1710, an activity recognition module 1712, a prompting module 1714 and a routine recommendation module 1716. The offline data receiving module 1702 receives one or more activities data from a network 1718. The activity segmentation module 1704 transforms a sensor data received from the network 1718 into one or more data segments on acquiring the one or more activities data. The activity discovery module 1706 estimates topic distribution for each of plurality of the data segments transformed.

The activity discovery module 1706 further topically groups the similar data segments into agglomerative clustering. The routine generation module 1708 generates a user's routine based on the clustered one or more data segments by at least one of language modelling and an expected utility. The activity recognition module 1712 determines an order in which sensor data are triggered for a particular activity cluster based on recurrent patterns and compares with data received from an online data segmentation module 1720. The activity recognition module 1712 further recognizes one or more activities based on the one or more data segments grouped topically and KNN. The prompting module 1714 prompts one or more activities to a user that are missed, left or uncompleted in the user's routine based on the order determined. The routine recommendation module 1716 recommends one or more alternate optimum IoT devices or services to the user when one or more disruptions are determined in the user's routine.

The database 1710 stores the user's routine generated and their corresponding time and one or more associated IoT device details for execution of the user's routine. The routine disruption handling and routine management unit further includes the online data segmentation module 1720 and a streaming data module 1722. The streaming data module 1722 is adapted to stream/transmit the data from the network. The data includes sensor data. The online data segmentation module 1720 receives a pattern or order of the data received from the network to perform data segmentation. In an embodiment, the routine disruption handling and routine management unit performs the routine generation in an offline erode. In another embodiment, the routine disruption handling and routine management unit performs the prompting and the routine recommendation to the user in an online mode.

Thus, the disclosure allows a user to detect one or more disruptions in a user's routine and automatically prompts the user about the one or more disruptions. Further the disclosure allows the user to autocomplete the one or more activities that are missed, disrupted or left uncompleted in the user's routine. Further, the disclosure recommends an alternate optimum IOT device or service to complete the user's routine. Further the disclosure intelligently prompts the user activities that are yet to be completed based on sensor data received from a network.

In the disclosure, the routine disruption handling and routine management unit suggests at least one of an alternate IoT device when at least one device associated with the user's routine is detected malfunctioned. Further, the routine disruption handling and routine management unit analyzes overlap of a particular user activity of a first user and a second user, notifies the first user and the second user the overlap of the particular user activity, and suggests the first user and the second user to share the common IoT device for the particular user activity when one or more user's routines in a common IoT device are detected as overlapping.

In the following detailed description of the embodiments of the invention, reference is made to the accompanying drawings that form a part hereof, and in which are shown by way of illustration specific embodiments in which the invention may be practiced. These embodiments are described in sufficient detail to enable se skilled in the art to practice the invention, and it is to be understood that other embodiments may be utilized and that changes may be made without departing from the scope of the disclosure. The following detailed description is, therefore, not to be taken in a limiting sense, and the scope of the disclosure is defined only by the appended claims.

The invention claimed is:

1. A method for operating an electronic device, the method comprising:
   receiving, by the electronic device, first data via a communication network;
   detecting, an operating condition of at least one of a number of device applications and internet of things (IoT) devices associated with a routine of user activities;
   displaying the at least one of the number of device applications and the IoT devices according to the operating condition;
   in response to receiving second data via the communication network, detecting, by the electronic device, disruptions in the operating condition of the at least one of the number of device applications and the IoT devices;
   identifying an impact on the routine of the user activities that are caused by the disruptions; and
   performing a disruption handling to provide a disruption solution for executing the routine of user activities.

2. The method of claim 1, wherein the impact in the routine of the user activities occurs based on at least one of: a disruption in a device, an interruption due to people, a disruption in services subscribed or used, an interruption due to resource limit, a disruption due to external event and external factor, a disruption due to external factor, an environment conflict, a disruption in routine management of multiple people, a disruption due to user health, or a disruption due to user unawareness.

3. The method of claim 1, wherein performing the disruption handling comprises:
   identifying one or more alternate IoT devices or services; and
   recommending, at least one of optimum alternate IoT device and service for completing the routine of the user activities impacted by the disruptions in the operating condition, and
   wherein the completion of the routine of the user activities is performed by at least one of: reassigning one or more disrupted activities, overriding the one or more disrupted activities, queuing the one or more disrupted activities, suggesting an alternate IoT device or service, recommending an optimum IoT device or service and auto-completing the one or more disrupted activities, or grouping the one or more disrupted activities.

4. The method of claim 1, wherein performing the disruption handling comprises:
   automatically reminding a user of the disruptions in an operating condition of one or more of the at least one of the number of device applications and the internet of things (IoT) devices based on at least one of a user's history or contexts recognized over a period of time.

5. The method of claim 1, wherein performing the disruption handling comprises at least one of:
   requesting help from at least one of a second user or one or more users, or
   allocating a task to at least one of the second user or the one or more users for completing the routine of the user activities.

6. The method of claim 1, wherein the disruption solution includes a configuration option comprising options of at least one of: an abort routine, a automatic handling, or a prompting.

7. The method of claim 6, wherein the automatic handling of the disruptions is performed based on factors of at least one of: rules, intelligence, or suggesting a third-party service.

8. The method of claim 1, further comprising:
   analyzing and storing at least one of: time, an activity order, or user particulars for the one or more activities performed by a user in the routine of the user activities.

9. The method of claim 3, wherein recommending the at least one of optimum alternate IoT device and service further comprises:
   acquiring one or more activities data from a network;
   transforming a sensor data received from the network into one or more data segments on acquiring the one or more activities data;
   estimating topic distribution for each of plurality of the data segments transformed;
   grouping topically similar data segments into agglomerative clustering;
   generating a routine of the user activities based on the clustered data segments by at least one of language modelling or an expected utility;
   determining an order in which sensor data are triggered for a particular activity cluster based on recurrent patterns;
   recognizing the one or more activities based on the one or more data segments grouped topically and k-nearest neighbors (KNN);
   prompting one or more activities that are missed, left, or uncompleted in the routine of the user activities to a user based on the order determined; and
   recommending one or more alternate IoT devices or services to the user based on the order determined.

10. The method of claim 9, wherein the prompting the one or more activities that are missed, left, or uncompleted in the routine of the user activities is performed using at least one of: a user interface (UI) based interaction, a voice based interaction, or a gesture based interaction.

11. The method of claim 1, wherein performing the disruption handling comprises:
    determining one or more activities that are left, missed, or uncompleted in the routine of the user activities based on at least one of a user's history and contexts using at least one of a machine learning technique or a natural language processing technique;
    predicting one or more succeeding activities of the routine of the user activities that a user intends to perform using probabilistic models; and
    automatically prompting a user to enable autocompleting the one or more activities that are left, missed, uncompleted, or user intended, and
    wherein the one or more activities that are left, missed, uncompleted, or user intended to be completed first in the routine of the user activities are detected based on at least one of the user's history or the contexts.

12. The method of claim 1, wherein performing the disruption handling comprises:
providing a user interface based interaction to modify the routine of the user activities, and
wherein modifying the routine of the user activities comprises at least one of: modifying routine parameters, modifying configuration parameters of one or more of IoT devices associated with the routine of the user activities, changing a sequence of tasks in the routine of the user activities and changing an interval between tasks in the routine of the user activities, or deleting the routine of the user activities.

13. The method of claim 1, further comprising:
detecting at least one device associated with the routine of the user activities has malfunctioned; and
performing recommendation for at least one of an alternate IoT device.

14. The method of claim 1, further comprising:
detecting one or more routines for activities of users overlap;
transmitting, to each of the users, information associated with the overlapping; and
performing recommendation to the each of the users for sharing at least one IoT device based on the information.

15. An electronic device in a wireless communication system, the electronic device comprising:
a display;
a transceiver; and
at least one processor; and
wherein the at least one processor is configured to:
receiving first data via a communication network;
detect an operating condition of at least one of a number of device applications and internet of things (IoT) devices associated with a routine of user activities;
display the at least one of the number of device applications and the IoT devices according to the operating condition;
in response to receiving second data via the communication network, detect disruptions in the operating condition of the at least one of the number of device applications and the IoT devices;
identify an impact on the routine of the user activities that are caused by the disruptions; and
perform a disruption handling to provide a disruption solution for executing the routine of user activities.

16. The electronic device of claim 15, wherein the impact on the routine of the user activities occurs based on at least one of: a disruption in a device, an interruption due to people, a disruption in services subscribed or used, an interruption due to resource limit, a disruption due to external event and external factor, a disruption due to external factor, an environment conflict, a disruption in routine management of multiple people, a disruption due to user health or a disruption due to user unawareness.

17. The electronic device of claim 15, wherein the at least one processor is further configured to:
identify one or more alternate IoT devices or services; and
recommend, at least one of optimum alternate IoT device and service for completing the routine of the user activities impacted by the disruptions in the operating condition, and
wherein the completion of the routine of the user activities is performed by at least one of: reassigning one or more disrupted activities, overriding the one or more disrupted activities, queuing the one or more disrupted activities, suggesting an alternate IoT device or service, recommending an optimum IoT device or service and auto-completing the one or more disrupted activities, or grouping the one or more disrupted activities.

18. The electronic device of claim 15, wherein the at least one processor is further configured to automatically remind a user of the disruptions in an operating condition of one or more of the at least one of the number of device applications and the internet of things (IoT) devices based on at least one of a user's history or contexts recognized over a period of time.

19. The electronic device of claim 15, wherein the at least one processor is further configured to:
determine one or more activities that are left missed or uncompleted in the routine of the user activities based on at least one of: a user's history or contexts using at least one of a machine learning technique or a natural language processing technique;
predict one or more succeeding activities of the routine of the user activities that the user intends to perform using probabilistic models; and
automatically prompt a user to enable autocompleting the one or more activities that are left, missed, uncompleted, or user intended, and
wherein the one or more activities that are left missed, uncompleted, or user intended to be completed first in the routine of the user activities are detected based on at least one of the user's history or the contexts.

20. The electronic device of claim 15, wherein the at least one processor is further configured to provide a user interface based interaction to modify the routine of the user activities, and
wherein modifying the routine of the user activities comprises at least one of: modifying routine parameters, modifying configuration parameters of one or more of the IoT devices associated with the routine of the user activities, changing a sequence of tasks in the routine of the user activities and changing an interval between tasks in the routine of the user activities, or deleting the routine of the user activities.

* * * * *